Patented June 16, 1953

2,642,444

UNITED STATES PATENT OFFICE 2,642,444

CHLOROMETHYLATED ARYL THIOETHERS OF THE ANTHRAQUINONE SERIES

David I. Randall, Easton, Pa., and Edgar E. Renfrew, Phillipsburg, N. J., assignors to General Aniline & Film Corporation, New York, N. Y., a corporation of Delaware No Drawing. Application January 19, 1951, Serial No. 206,934

1 Claim. (Cl. 260—383)

This invention relates to novel chloromethylated derivatives of aryl thioethers of anthraquinone, hydroxy anthraquinone, alkylamino anthraquinone and anthrapyridone, and to a process for their preparation.

We have discovered that aryl thioethers of anthraquinones and anthrapyridones and, particularly, phenyl thioethers such as 1-methylamino-4-phenylmercapto anthraquinone, 4-phenylmercapto anthrapyridone, 1-hydroxy-4-phenylmercapto anthraquinone, 1,4-diphenylmercapto anthraquinone and 1,5-diphenylmercapto anthraquinone, react with bis-chloromethyl ether or equivalent chloromethylating reagents in concentrated sulfuric acids as condensing media to yield derivatives in which a chloromethyl group or groups are present as nuclear substituents in the aryl thioether radical. It has been found that the chloromethyl groups do not condense with any amino groups which are present in the subject molecules. The chloromethyl-substituted derivatives of the parent compounds are obtained in sufficiently pure form to be used as intermediates for dyestuff preparation, such as by conversion to the corresponding methylene quaternary nitrogen base salts or isothiouronium quaternary salts of our copending application Serial No. 206,935 filed under even date herewith. These quaternary salts of the chloromethylated aryl thioethers constitute valuable dyestuffs for textile materials, especially cellulosic derivatives. The chloromethyl aryl thioethers are also suitable for reaction with amines and phenols.

It is the object of this invention to provide novel chloromethyl-substituted derivatives of aryl thioethers of anthraquinone, hydroxy anthraquinone, methylamino anthraquinone and anthrapyridone, and to provide a process for the preparation of these compounds.

In preparing the chloromethylated derivatives of this invention, bis-chloromethyl ether is added to a solution of an aryl thioether in concentrated sulfuric acid of at least 95% $H_2SO_4$. The reaction mixture is stirred at moderate temperatures as, for example, from 0 to 65° C. The reaction product is recovered by drowning the mixture in ice water and filtering out and washing the insoluble product thereby precipitated.

An excess of bis-chloromethyl ether is generally employed, preferably at least 2 moles per mole of the aryl thioether compound.

The number of chloromethyl groups introduced into each aryl thioether group depends upon the number, position and nature of substituents already present, and upon the reaction conditions such as temperature, concentration and duration. Ordinarily, one chloromethyl group is introduced into the aryl thioether group in an unoccupied position. In some cases, two chloromethyl groups are introduced into each aryl thioether member, as in the case of 1-methylamino-4-phenylmercapto anthraquinone and 1,4-diphenylmercapto anthraquinone.

The aryl radicals of the aryl thioethers of anthraquinone, hydroxy anthraquinone, methylamino anthraquinone and anthrapyridone may be substituted in one or more nuclear positions by substituents which are unreactive toward the chloromethylating agent, provided that at least one reactive position remains unoccupied. Suitable unreactive substituents are, for example, lower alkyl (e. g., methyl and ethyl) groups and halogen (e. g., chlorine and bromine) atoms. The aryl thioether groups may occupy one or more of the positions of the anthraquinone or anthrapyridone nucleus and when more than one such aryl thioether radical is present chloromethylation occurs in each of said radicals.

The novel compounds of this invention are accordingly chloromethyl-substituted aryl thioethers, preferably phenyl thioethers of anthraquinone, hydroxy anthraquinone, alkylamino anthraquinone and anthrapyridone, in which at least one chloromethyl group occupies a nuclear position of an aryl thioether radical and other chloromethyl groups may occupy positions on either the same or additional aryl thioether radicals. The latter, if otherwise substituted, may contain as substituents unreactive lower alkyl groups such as methyl and ethyl or halogen atoms.

Our invention will be more fully understood from the following examples illustrating preferred embodiments of the invention wherein parts and percentages are by weight unless otherwise expressed.

*Example 1*

In a suitable vessel there were placed 940.0 parts sulfuric acid (99.7%) and 74.0 parts 4-phenylmercapto anthrapyridone. When the latter was dissolved there were stirred in 69.0 parts bis-chloromethyl ether. The reaction mixture was maintained at 60° C. for 16 hours, after which it was cooled and poured into 10,000.0 parts water and ice. The material which precipitated was filtered off and dried. Analysis showed it to contain 14.6% chlorine. A compound bearing two chloromethyl groups has the formula $C_{25}H_{17}O_2NSCl_2$, chlorine 15.3%. Accordingly, the product has the structural formula

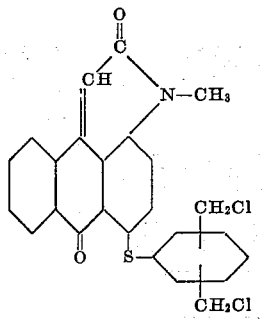

*Example 2*

In a suitable vessel there were placed 940.0 parts sulfuric acid (99.7%) and 66.0 parts 1-hydroxy-4-phenylmercapto anthraquinone. When the latter was dissolved there were stirred in 69.0 parts bis-chloromethyl ether. The reaction mixture was maintained at 60° C. for 16 hours, after which it was cooled and poured into 10,000.0 parts water and ice. The material which precipitated was filtered off and dried. Analysis showed the product to contain 11.2% chlorine. A product bearing one chloromethyl group has the formula $C_{12}H_{13}O_3SCl$, Cl, chlorine 9.6%. Accordingly, the product obtained has the structural formula

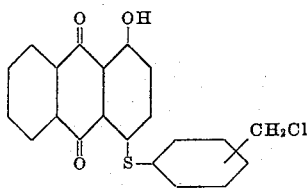

*Example 3*

In a suitable vessel there were placed 940.0 parts sulfuric acid (99.7%) and 69.0 parts 1-methylamino-4-phenylmercapto anthraquinone. When this had dissolved there were stirred in 69.0 parts bis-chloromethyl ether. The reaction mixture was maintained at 60° C. for 16 hours, after which it was cooled and poured into 10,000.0 parts water and ice. The mixture which precipitated was filtered off and dried. Analysis showed it to contain 16.1% chlorine. A product bearing two chloromethyl groups has the formula $C_{23}H_{17}O_2NSCl_2$, chlorine 16.1%. Accordingly, the product obtained has the structural formula

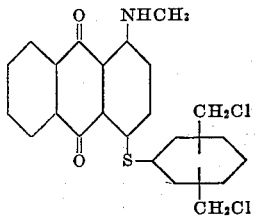

*Example 4*

In a suitable vessel there were placed 940.0 parts sulfuric acid (99.7%) and 42.4 parts 1,4-diphenylmercapto anthraquinone. When this had dissolved there were added, with stirring, 69.0 parts bis-chloromethyl ether. The reaction mixture was maintained at 60° C. for 16 hours, after which it was cooled and poured into 10,000.0 parts water and ice. The material which precipitated was filtered off and dried. Analysis showed the product to contain 22.2% chlorine. A product bearing four chloromethyl groups has the formula $C_{30}H_{20}O_2S_2Cl_4$, chlorine 23.0%. Accordingly, the product obtained has the structural formula

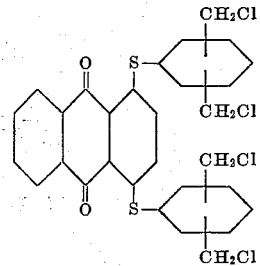

*Example 5*

In a suitable vessel there were placed 940.0 parts sulfuric acid (99.7%) and 42.4 parts 1,5-diphenylmercapto anthraquinone. When the latter had dissolved there were added, with stirring, 69.0 parts bis-chloromethyl ether. The reaction mixture was maintained at 60° C. for 16 hours, after which it was cooled and poured into 10,000.0 parts water and ice. The material which precipitated was filtered off and dried. Analysis showed that the product contained 22.1% chlorine. A product bearing four chloromethyl groups has the formula $C_{30}H_{20}O_2S_2Cl_4$, chlorine 23.0%. Accordingly, the product obtained has the structural formula

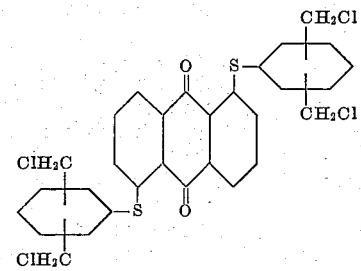

We claim:

A nuclear chloromethyl-substituted phenyl thioether of hydroxy anthraquinone having the formula

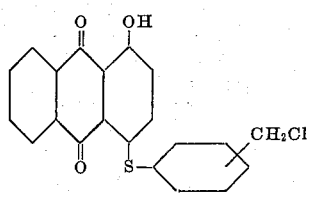

DAVID I. RANDALL.
EDGAR E. RENFREW.

References Cited in the file of this patent
UNITED STATES PATENTS

| Number | Name | Date |
|---|---|---|
| 2,544,825 | Coffey et al. | Mar. 13, 1951 |

FOREIGN PATENTS

| Number | Country | Date |
|---|---|---|
| 613,980 | Great Britain | Dec. 7, 1948 |
| 613,982 | Great Britain | Dec. 7, 1948 |